(12) United States Patent
Martin

(10) Patent No.: US 7,634,380 B2
(45) Date of Patent: Dec. 15, 2009

(54) GEO-REFERENCED OBJECT IDENTIFICATION METHOD, SYSTEM, AND APPARATUS

(75) Inventor: William Martin, Corvallis, OR (US)

(73) Assignee: Trimble Navigation Limited, Sunnyvale, CA (US)

( * ) Notice: Subject to any disclaimer, the term of this patent is extended or adjusted under 35 U.S.C. 154(b) by 185 days.

(21) Appl. No.: 11/452,866

(22) Filed: Jun. 13, 2006

(65) Prior Publication Data

US 2007/0288197 A1   Dec. 13, 2007

(51) Int. Cl.
G06F 19/00 (2006.01)
(52) U.S. Cl. .................. 702/150; 701/207; 702/5
(58) Field of Classification Search ............. 702/150, 702/152, 154, 5; 701/35, 211, 200, 213, 701/217, 207; 386/46, 117; 342/357.14, 342/357.06, 357.17; 455/414.2; 340/988
See application file for complete search history.

(56) References Cited

U.S. PATENT DOCUMENTS

| | | | |
|---|---|---|---|
| 4,949,089 A | 8/1990 | Ruszkowski et al. | |
| 5,077,557 A | 12/1991 | Ingensand | |
| 5,233,357 A | 8/1993 | Ingensand et al. | |
| 5,528,518 A * | 6/1996 | Bradshaw et al. | 702/150 |
| 5,568,152 A | 10/1996 | Janky et al. | |
| 5,644,318 A | 7/1997 | Janky et al. | |
| 5,784,027 A | 7/1998 | Davis | |
| 5,903,235 A | 5/1999 | Nichols | |
| 5,977,908 A | 11/1999 | Nichols | |
| 6,067,046 A * | 5/2000 | Nichols | 342/357.14 |
| 6,282,362 B1 * | 8/2001 | Murphy et al. | 386/46 |
| 2006/0238418 A1 * | 10/2006 | Monnerat et al. | 342/357.09 |
| 2007/0010924 A1 * | 1/2007 | Otani et al. | 701/35 |

* cited by examiner

*Primary Examiner*—Drew A Dunn
*Assistant Examiner*—Hien X Vo

(57) ABSTRACT

A method and system are described, which are used to identify a geo-referenced object. In one embodiment, a position determining component is used to determine the geographic position of a handheld electronic device. An azimuth determination component determines an azimuth from the handheld electronic device to an object. An incline measurement device measures the vertical angle between the handheld electronic device and the object. Finally, based upon the geographic position, azimuth, and vertical angle of the handheld electronic device a database is automatically accessed wherein a description of the object is stored.

29 Claims, 6 Drawing Sheets

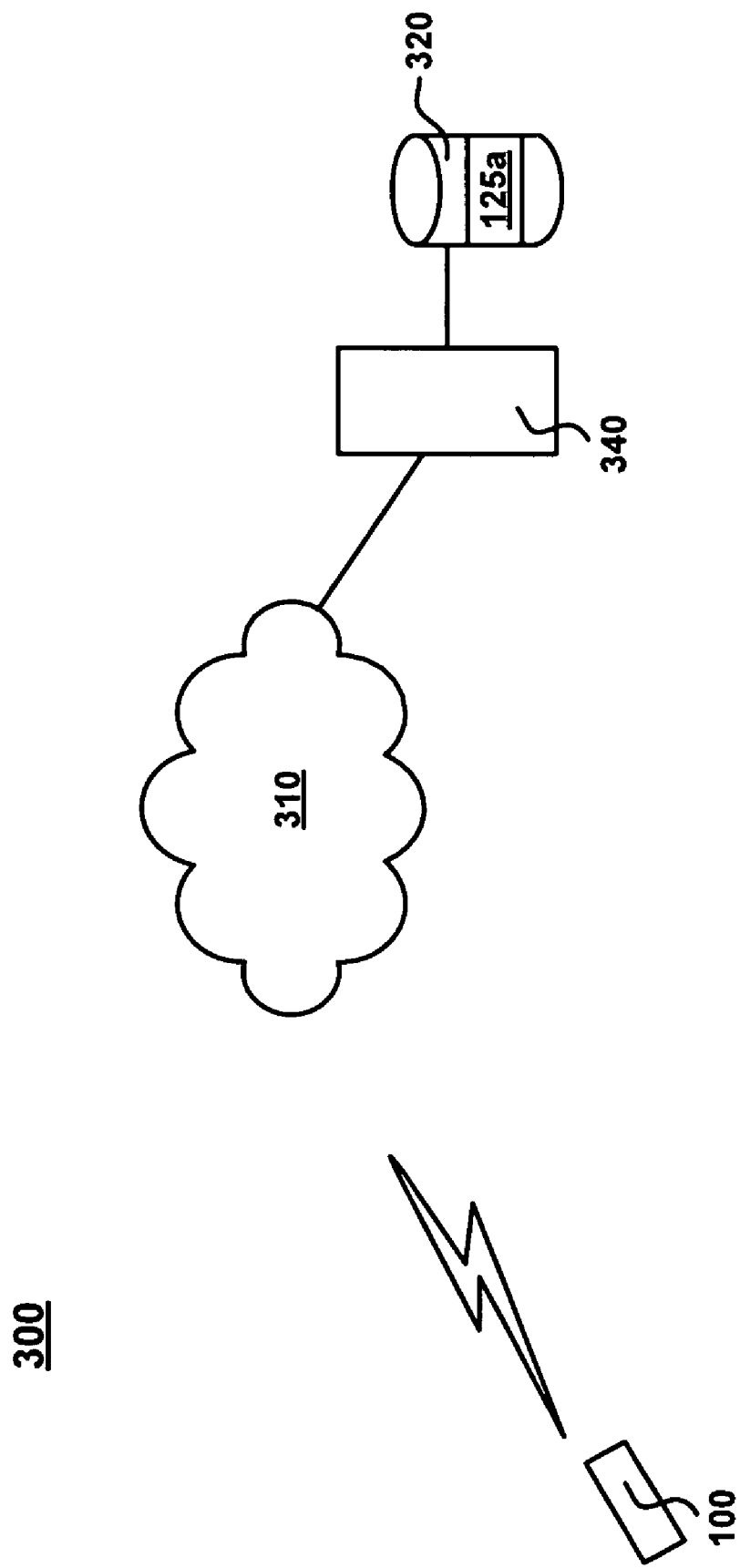

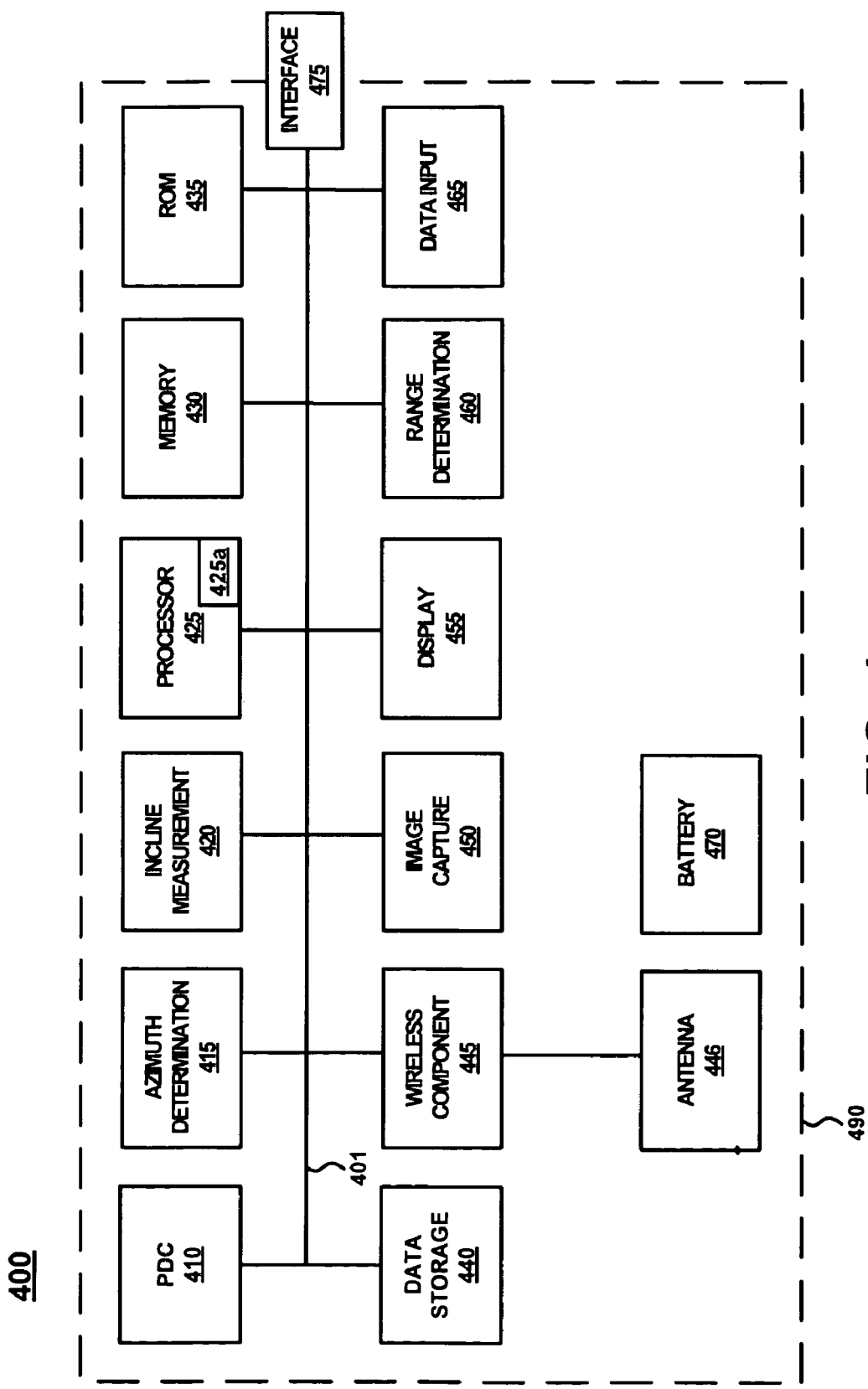

GEO-REFERENCED OBJECT IDENTIFICATION METHOD, SYSTEM, AND APPARATUS

TECHNICAL FIELD

Embodiments of the present invention are related to identifying an object based upon its geographic location and accessing information about that object.

BACKGROUND

Data collection devices are frequently used to collect and/or update geographic databases. However, these data collectors are typically relatively large and heavy for a handheld device and therefore may be unwieldy for an operator to use. Additionally, these data collectors use a large number of buttons and icons for specific data entry functions. As a result, the operator of one of these data collectors has to be trained to properly use the interface and may have difficulty operating the device, even after receiving this training. Additionally, these data collectors are relatively expensive (e.g., $1500-$5000) and therefore the initial purchase and/or replacement of lost or stolen data collectors is not a trivial investment.

SUMMARY

A method and system are described, which are used to identify a geo-referenced object. In one embodiment, a position determining component is used to determine the geographic position of a handheld electronic device. An azimuth determination component determines an azimuth from the handheld electronic device to an object. An incline measurement device measures the vertical angle between the handheld electronic device and the object. Finally, based upon the geographic position, azimuth, and vertical angle of the handheld electronic device a database is automatically accessed wherein a description of the object is stored.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description are not drawn to scale.

FIG. 3 shows a system for identifying a geo-referenced object in accordance with embodiments of the present invention.

FIG. 4 is a block diagram of another exemplary handheld electronic device which can be used to identify a geo-referenced object in accordance with embodiments of the present invention.

DETAILED DESCRIPTION

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Figure 1:
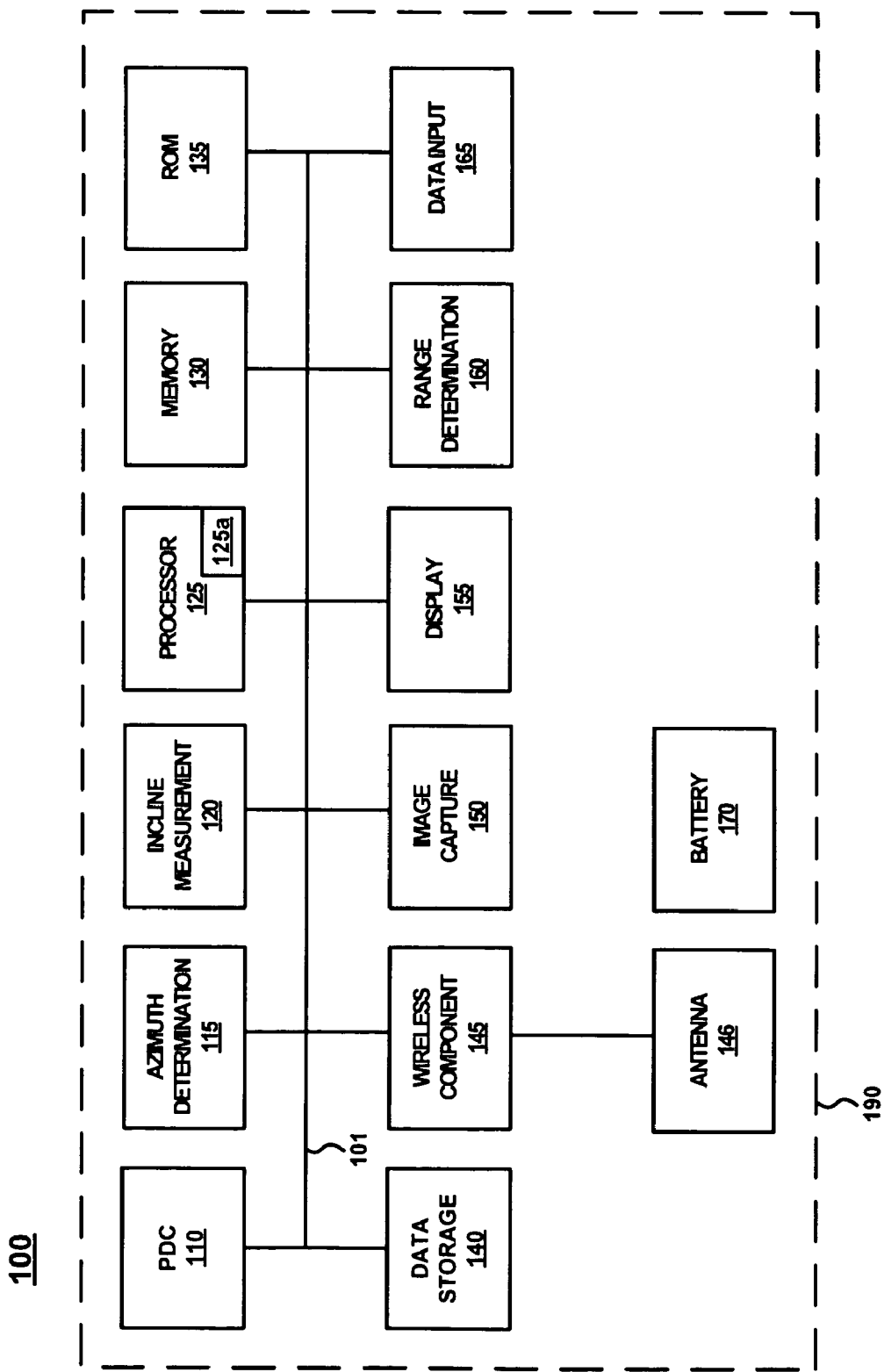
FIG. 1 is a block diagram of an exemplary handheld electronic device which can be used to identify a geo-referenced object in accordance with embodiments of the present invention.

FIG. 1 is a block diagram of an exemplary handheld electronic device 100 which can be used to identify a geo-referenced object in accordance with embodiments of the present invention. In FIG. 1 a position determining component 110, an azimuth determining component 115, an incline measuring device 120 and a processor 125 are coupled with a bus 101.

Position determining component 110 is for determining the location of handheld electronic device 100. In embodiments of the present invention, position determining component 110 comprises a GPS antenna 112 and a GPS receiver 111. More generally, position determining component is operable to utilize Global Navigation Satellite System (GNSS) radio signals to determine the geographic position of handheld electronic device 100. However, while the present embodiment specifically recites a GNSS position determining component, embodiments of the present invention are well suited to utilize a variety of terrestrial-based and satellite-based position determining components as well. In embodiments of the present invention, the geographic position determined by position determining component 110 describes the latitude and longitude of handheld electronic device 100. However, position determining component 110 may also determine the elevation of handheld electronic device in embodiments of the present invention.

Azimuth determination component 115 is for determining a horizontal angle, relative to handheld electronic device 100, from a reference direction (e.g., magnetic north, or true north) to a geo-referenced object. In embodiments of the present invention, azimuth determination component 115 may detect variations in the Earth's magnetic field, or may utilize a gyroscope to determine true north.

Incline measurement device 120 is for measuring a vertical angle difference between an artificial horizon and an object at which handheld electronic device 100 is pointed. There are a variety of devices which are suitable for measuring an incline in embodiments of the present invention including, but not limited to, tilt sensors and inclinometers. It is noted that in embodiments of the present invention, incline measurement device 120 may measure the tilt of handheld electronic device 100 in more than one plane of motion (e.g., roll and pitch) to more precisely determine the vertical difference described above. Additionally, incline measurement device 120 may comprise a component which automatically determines a level plane of reference which is used as a baseline measurement for measuring the vertical angle described above.

Processor 125 is for processing digital information and instructions and bus 101 is for conveying digital information between the various components of handheld electronic device 100. Also coupled with bus 101 is a random access memory (RAM) 130 for storing the digital information and instructions of a more volatile nature and a non-volatile read only memory (ROM) 135 for storing information and instructions of a more permanent nature. In addition, handheld electronic device 100 may optionally include a data storage device 140 for storing vast amounts of data. In embodiments of the present invention, data storage device 140 may comprise a removable storage medium such as a smart card or an optical data storage device. Alternatively, data storage device 140 may comprise a programmable data storage device such as a flash memory device to facilitate quickly updating data. It should be noted that instructions for processor 125 as well as position coordinates which define a geo-referenced object, previously determined geographic locations of handheld electronic device 100, and previously sampled GPS signals can be stored either in memory 130, ROM 135, data storage device 140, or in an external storage device (not shown).

A wireless communications component 145, comprising a wireless modem 108 and a wireless antenna 109, is also coupled with bus 101. Wireless communications component 145 is for transmitting and receiving wireless messages (e.g., data and/or commands). In one embodiment, wireless communications component 145 is comprised of a cellular wireless antenna 146 and a cellular wireless modem 147. In embodiments of the present invention, wireless communication component 145 is compliant with the Global System for Mobile Communications (GSM) specification. While the present invention recites a GSM compliant wireless communication device, other wireless communication specifications, such as the Global Packet Radio Service (GPRS) specification, may be utilized in embodiments of the present invention. In one embodiment, handheld electronic device 100 sends and receives messages using the Short Message Service (SMS). However, the present invention is well suited to utilize other message formats as well. In other embodiments of the present invention, wireless communications component 145 may comprise a Bluetooth wireless communications device, or another wireless communications device such as a Wi-Fi transceiver. Wi-Fi transceivers are often used to create local area networks between a portable computer and an Internet access point in public areas such as airports, coffee shops, libraries, and the like.

Handheld electronic device 100 further comprises an image capture device 150 and a display device 155 for displaying information to a user. Image capture device 150 may comprise a charge coupled device (CCD) or a complementary metal oxide semiconductor (CMOS) digital image capture device. Display device 155 may be a liquid crystal device, cathode ray tube, a field emission display, or other display device, suitable for displaying graphic images and alphanumeric characters recognizable to a user. In embodiments of the present invention, a range determining device may also be coupled with bus 101. Typically, range determining device 160 is a laser range determining device. However, other technologies such as sound-based (e.g., ultra-sonic range finders) and optical range finders and may also be used in embodiments of the present invention. It is appreciated that the current description of handheld electronic device 100 is exemplary and that one of more of the above described components (e.g., image capture device 150, range determining device 160) may be omitted in embodiments of the present invention.

A user input device 165 may also be coupled with bus 101 in embodiments of the present invention. In embodiments of the present invention, user input device 165 may comprise a keyboard, and a cursor control device (e.g., a mouse, trackball, light pen, touch pad, joystick, etc.), for inputting data, selections, updates, and for controlling handheld electronic device 100. Handheld electronic device 100 may optionally include a battery 170 for providing power for handheld electronic device 100.

Figure 2A:
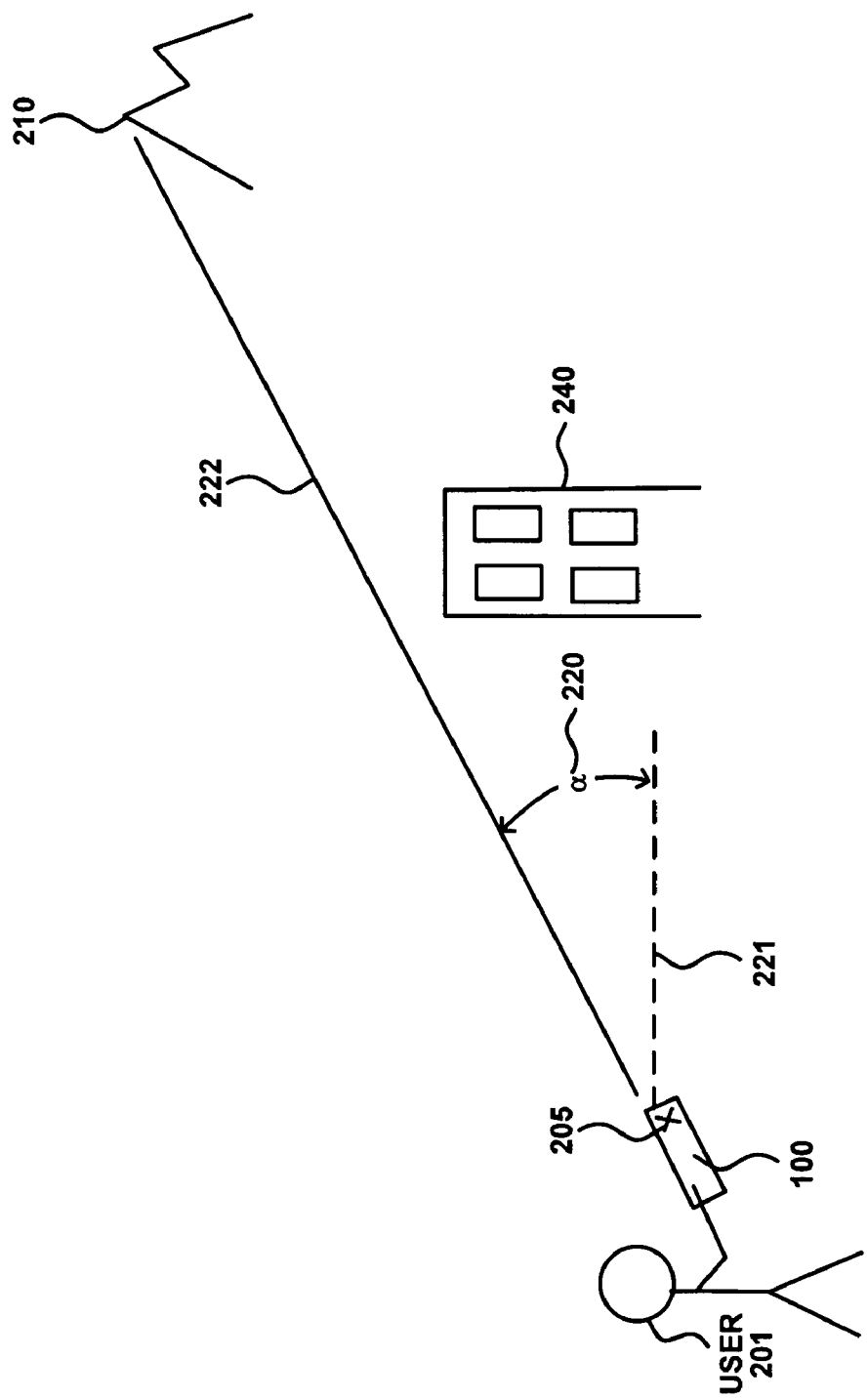
FIGS. 2A and 2B are side and tops views respectively which show the identification of a geo-referenced object using a handheld electronic device in accordance with embodiments of the present invention.
Figure 2B:
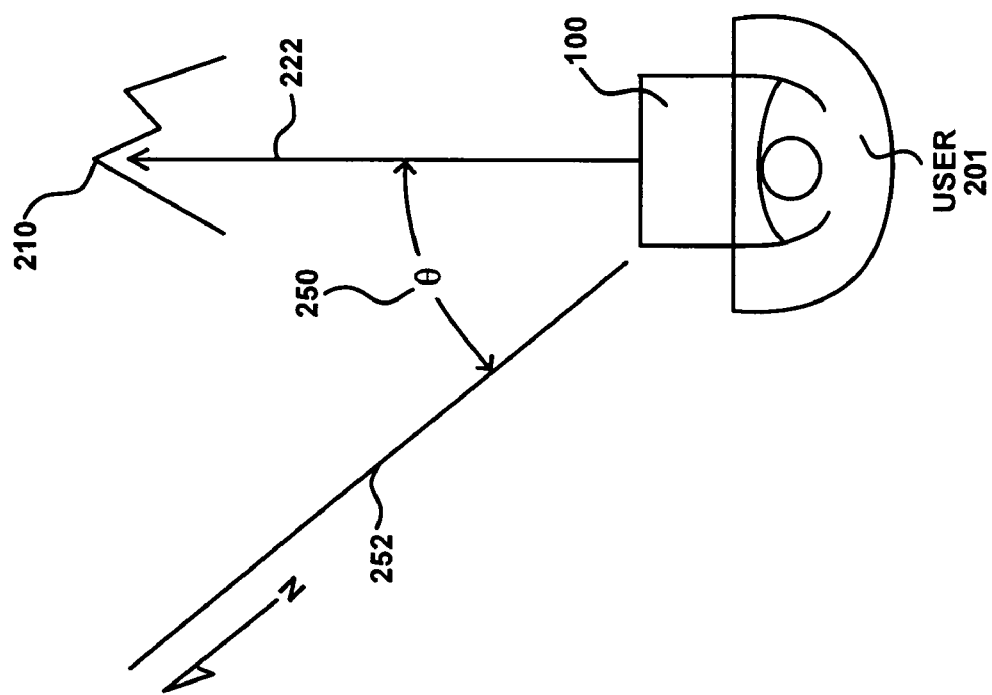

FIGS. 2A and 2B are side and tops views respectively which show the identification of a geo-referenced object using a handheld electronic device in accordance with embodiments of the present invention. In FIG. 2A, a user 201 points handheld electronic device 100 at a geo-referenced object 210 along a sight line (e.g., 222). For the purposes of the present invention the term "geo-referenced object" means an object or geographic feature having a measured geographic position. This can include buildings, dams, bridges, roadways, signposts, markers and other manmade structures as well as geographic features such as mountains, hills, rivers, coastlines, forests, etc. In embodiments of the present invention, image capture device 150 and display device 155 can be used to facilitate pointing handheld electronic device 100 in the direction of geo-referenced object 210. In FIG. 2A, incline measurement device has determined that sight line 222 is oriented at a vertical angle α (e.g., 220) above a reference horizon (e.g., 221). Furthermore, using position determining component 110, handheld electronic device 100 determines its geographic position (e.g., 205 of FIG. 2A).

With reference to FIG. 2B, when user 201 points handheld electronic device 100 at geo-referenced object 201, azimuth determining component 115 determines the azimuth θ (e.g., 250) which is defined as the horizontal angle between sight line 222 from a reference North direction 252 (e.g., magnetic North, or true North).

In embodiments of the present invention, the geographic position 205 as well as the azimuth θ250 and vertical angle α220 are used to identify geo-referenced object 210. In one embodiment, this can be accomplished by processor 125 using object identification component 125a. In another embodiment, as will be discussed in greater detail below, geographic position 205 as well as the azimuth θ250 and vertical angle α220 are wirelessly transmitted to a remote server which is operable for identifying geo-referenced object 210 based upon this information. In embodiments of the present invention, additional data may be input to handheld electronic device 100 by user 201 using data input device 165. This additional data may be used to generally identify which geo-referenced object user 201 is trying to identify. For example, referring again to FIG. 2A, user 201 may input that geo-referenced object 210 comprises a mountain rather than building 240 which may generally lie along sight line 222, but which is not the intended object being identified. Additionally, range determining component 160 may be used to determine the distance, conventionally shown as 222, between handheld electronic device 100 and geo-referenced object 210.

In embodiments of the present invention, after geo-referenced object 210 has been identified, a database (e.g., 320 of FIG. 3), where a description of the geo-referenced object is stored, can be accessed. In embodiments of the present invention, database 320 can be accessed wirelessly by handheld electronic device via communication network (e.g., 310 of FIG. 3) using wireless communication component 145. The description of the geo-referenced object may include, but is not limited to, geographic position information (e.g., latitude and longitude), elevation data, physical data, historical data, pictures, multimedia information, and other data types such as lot number, address, name, etc. In embodiments of the present invention, handheld electronic device may be used to edit or update information in database 320. As described above, it is appreciated that occasionally, two or more objects may be indicated based upon the geographic position 205, azimuth θ250, and vertical angle α220 of handheld electronic device 100. Accordingly, in embodiments of the present invention, database 320 may initially return a plurality of results to an inquiry by handheld electronic device 100. For example, with reference to FIG. 2A, an initial return from database 320 may list building 240 and geo-referenced object 210. User 201 may then select which of the objects is to be identified.

In another embodiment of the present invention, handheld electronic device 100 further comprises an object identification component 125a. In embodiments of the present invention, some, or all of, the data stored in database 320 may be stored in handheld electronic device 100 (e.g., in data storage device 140) and accessed by processor 125 upon activation of handheld electronic device 100). It is appreciated that in embodiments of the present invention, the data comprising object identification component 125a may comprise a subset of the data comprising database 320. In embodiments of the present invention, when processor 125 accesses the geographic position 205, azimuth θ250, and vertical angle α220 of handheld electronic device 100, it uses object identification component 125a to identify and/or access a description of geo-referenced object 210.

FIG. 3 shows a system 300 for identifying a geo-referenced object in accordance with embodiments of the present invention. In the embodiment of FIG. 3, system 300 comprises handheld electronic device 100 which is communicatively coupled with database 320 via wireless communication network 310. Utilizing a wireless communication network is advantageous in that handheld electronic device 100 may be implemented as a portable data collector in a manner similar to a GIS data collector. In the embodiment of FIG. 3, identification component 125a is a component of a computer 340 communicatively coupled with network 310 and database 320. It is appreciated that handheld electronic device may also be communicatively coupled with another computer network (e.g., via a wired or wireless communication network) in embodiments of the present invention. It is further appreciated that additional components have been omitted from FIG. 3 for clarity.

FIG. 4 is a block diagram of another exemplary handheld electronic device 400 which can be used to identify a geo-referenced object in accordance with embodiments of the present invention. In the embodiment of FIG. 4, the present invention device 400 comprises an object identification apparatus which may be communicatively coupled with another electronic device (not shown) such as a cellular telephone, personal digital assistant (PDA), personal or laptop computer, etc. via an interface 475. In the embodiment of FIG. 4, device 400 comprises a position determining component 410, an azimuth determining component 415, and an incline measuring device 420 coupled with a bus 401.

Position determining component 410 is for determining the location device 400. In embodiments of the present invention, position determining component 410 comprises a GPS antenna 412 and a GPS receiver 411. More generally, position determining component is operable to utilize Global Navigation Satellite System (GNSS) radio signals to determine the geographic position of device 400. However, while the present embodiment specifically recites a GNSS position determining component, embodiments of the present invention are well suited to utilize a variety of terrestrial-based and satellite-based position determining components as well. In embodiments of the present invention, the geographic position determined by position determining component 410 describes the latitude and longitude of device 400. However, position determining component 410 may also determine the elevation of handheld electronic device in embodiments of the present invention.

Azimuth determination component 415 is for determining a horizontal angle, relative to device 400, from a reference direction (e.g., magnetic north, or true north) to a geo-referenced object. In embodiments of the present invention, azimuth determination component 415 may detect variations in the Earth's magnetic field, or may utilize a gyroscope to determine true north.

Incline measurement device 420 is for measuring a vertical angle difference between an artificial horizon and an object at which device 400 is pointed. There are a variety of devices which are suitable for measuring an incline in embodiments of the present invention including, but not limited to, tilt sensors and inclinometers. It is noted that in embodiments of the present invention, incline measurement device 420 may measure the tilt of handheld electronic device 400 in more than one plane of motion (e.g., roll and pitch) to more precisely determine the vertical difference described above. Additionally, incline measurement device 420 may comprise a component which automatically determines a level plane of reference which is used as a baseline measurement for measuring the vertical angle described above.

A processor 425 coupled with bus 401 is for processing digital information and instructions and bus 401 is for conveying digital information between the various components of device 400. Also coupled with bus 401 is a random access memory (RAM) 430 for storing the digital information and instructions of a more volatile nature and a non-volatile read only memory (ROM) 135 for storing information and instructions of a more permanent nature. In addition, device 400 may optionally include a data storage device 440 for storing vast amounts of data. In embodiments of the present invention, data storage device 440 may comprise a removable storage medium such as a smart card or an optical data storage device. Alternatively, data storage device 440 may comprise a programmable data storage device such as a flash memory device to facilitate quickly updating data. It should be noted that instructions for processor 425 as well as position coordinates which define a geo-referenced object, previously determined geographic locations of device 400, and previously sampled GPS signals can be stored either in memory 430, ROM 435, data storage device 440, or in an external storage device (not shown).

A wireless communications component 445, comprising a wireless modem 408 and a wireless antenna 409, is also coupled with bus 401. Wireless communications component 445 is for transmitting and receiving wireless messages (e.g., data and/or commands). In one embodiment, wireless communications component 445 is comprised of a cellular wireless antenna 446 and a cellular wireless modem 447. In embodiments of the present invention, wireless communication component 445 is compliant with the Global System for Mobile Communications (GSM) specification. While the present invention recites a GSM compliant wireless communication device, other wireless communication specifications, such as the Global Packet Radio Service (GPRS) specification, may be utilized in embodiments of the present invention. In one embodiment, device 400 sends and receives messages using the Short Message Service (SMS). However, the present invention is well suited to utilize other message formats as well. In other embodiments of the present invention, wireless communications component 445 may comprise a Bluetooth wireless communications device, or another wireless communications device such as a Wi-Fi transceiver. Wi-Fi transceivers are often used to create local area networks between a portable computer and an Internet access point in public areas such as airports, coffee shops, libraries, and the like.

Device 400 further comprises an image capture device 450 and a display device 455 for displaying information to a user. Image capture device 450 may comprise a charge coupled device (CCD) or a complementary metal oxide semiconductor (CMOS) digital image capture device. Display device 455 may be a liquid crystal device, cathode ray tube, a field emission display, or other display device, suitable for displaying graphic images and alpha-numeric characters recognizable to a user. In embodiments of the present invention, a range determining device may also be coupled with bus 401. Typically, range determining device 460 is a laser range determining device. However, other technologies such as sound-based (e.g., ultra-sonic range finders) and optical range finders and may also be used in embodiments of the present invention. An interface 475 is coupled with bus 401 to facilitate communicatively coupling device 400 with another device such as handheld electronic device 480. In the embodiment of FIG. 4, these components are enclosed within a housing 490.

In an embodiment of the present invention, device 400 further comprises an object identification component 425a. In embodiments of the present invention, some, or all of, the data stored in database 320 may be stored in device 400 (e.g., in data storage device 440 and accessed by processor 425 upon activation of device 400). It is appreciated that in embodiments of the present invention, the data comprising object identification component 425a may comprise a subset of the data comprising database 320. In embodiments of the present invention, when processor 425 accesses the geographic position 205, azimuth θ250, and vertical angle α220 of device 400, it uses object identification component 425a to identify and/or access a description of geo-referenced object 210.

It is noted that in embodiments of the present invention, some of the components shown in FIG. 4 may be omitted from device 400 depending upon the configuration of handheld electronic device 480. For example, if handheld electronic device 480 comprises a cellular telephone, any of image capture device 450, processor 425, wireless communication component 445, display device 455, data input device 465, memory 430, ROM 435, data storage device 340, and battery 470 may be redundant if included in device 400. Therefore, in embodiments of the present invention, device 400 comprises at least position determining component 410, azimuth determining component 415, incline measuring device 420 and bus 401.

The embodiment of the present invention described above with reference to FIG. 4 is advantageous in that a user can couple device 400 with an otherwise unmodified legacy electronic device (e.g., a cellular telephone, laptop computer, PDA, etc) and utilize that electronic device as a geo-referenced object identification apparatus. More specifically, the user can utilize the functionality of handheld electronic device 100 described above with reference to FIG. 1 at a reduced cost because some of the components of handheld electronic device 100 may be omitted from device 400. Furthermore, because device 400 is removeably coupled with handheld electronic device 480, it can be disconnected from handheld electronic device 480 when the user no longer wishes to use the geo-referenced object identification functionality. It is appreciated that in embodiments of the present invention, software instructions and data for utilizing the functionality of device 100 may be downloaded into handheld electronic device 480.

Figure 5:
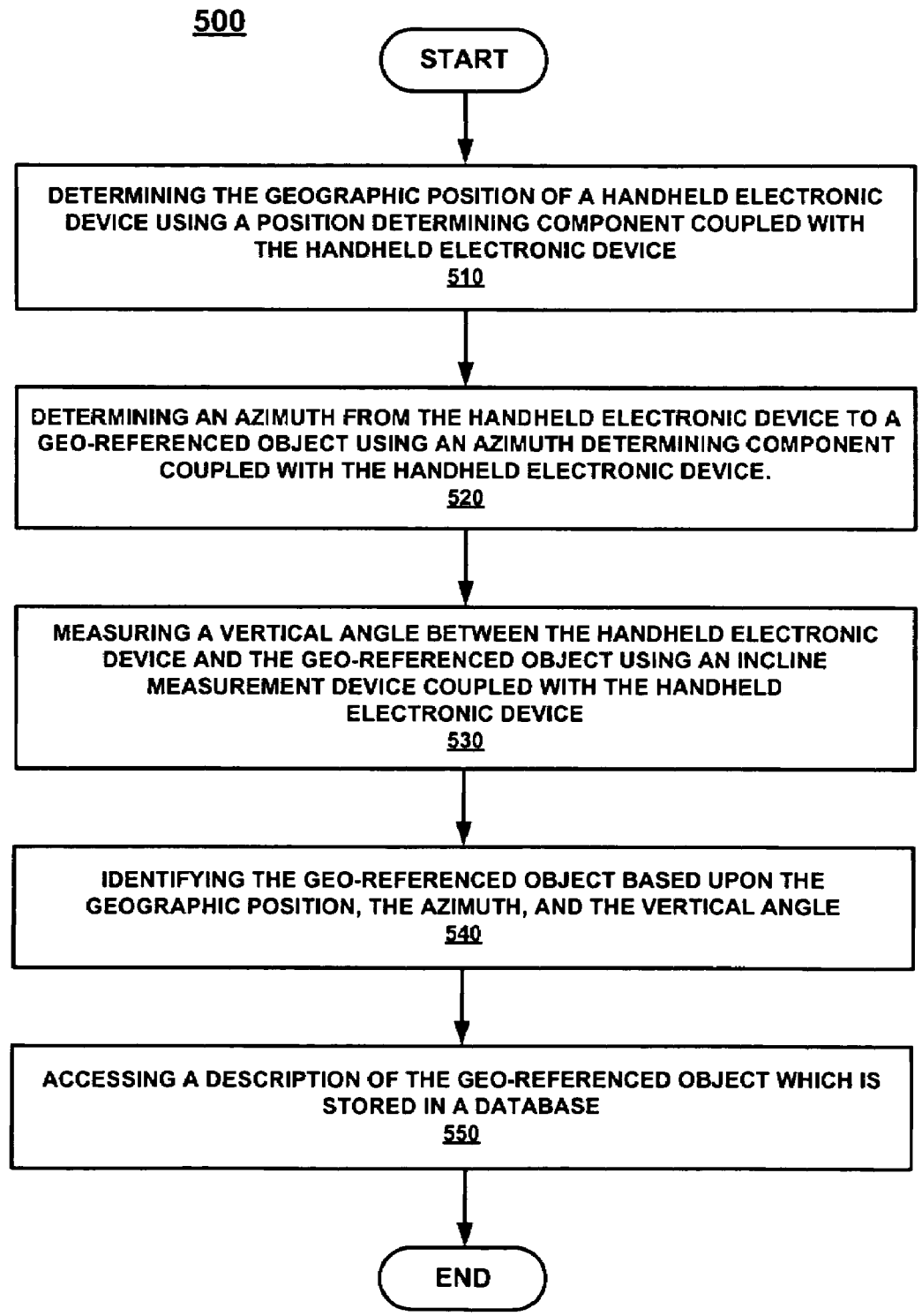
FIG. 5 is a flowchart of a method for identifying a geo-referenced object in accordance with embodiments of the present invention.

FIG. 5 is a flowchart of a method 500 for identifying a geo-referenced object in accordance with embodiments of the present invention. In step 510 of FIG. 5, determining a geographic position of a handheld electronic device is determined using a position determining component coupled with a handheld electronic device. As described above with reference to FIGS. 1 and 4, the geographic position of a handheld electronic device may be determined using position determining component 110 or 410 of FIGS. 1 and 4 respectively. As discussed above with reference to FIG. 1, position determining component 110 may be disposed within the handheld electronic device in embodiments of the present invention.

In step 520 of FIG. 5, an azimuth from the handheld electronic device to the geo-referenced object is determined using an azimuth determining component coupled with the handheld electronic device. As described above with reference to FIGS. 1 and 4, azimuth from the handheld electronic device to the geo-referenced object may be determined using azimuth determining component 115 or 415 of FIGS. 1 and 4 respectively. As discussed above with reference to FIG. 1, azimuth determining component 115 may be disposed within the handheld electronic device in embodiments of the present invention.

In step 530 of FIG. 5, a vertical angle between the handheld electronic device and the geo-referenced object is measured using an incline measurement device coupled with the handheld electronic device. As described above with reference to FIGS. 1 and 4, the vertical angle between the handheld electronic device and the geo-referenced object may be measured using incline measurement device 120 or 420 of FIGS. 1 and 4 respectively. As discussed above with reference to FIG. 1, incline measurement device 120 may be disposed within the handheld electronic device in embodiments of the present invention.

In step 540 of FIG. 5, the geo-referenced object is identified based upon the geographic position, the azimuth, and the vertical angle. In embodiments of the present invention, identification of geo-referenced object 210 may be performed by database 320, handheld electronic device 100, device 400, or by another object identification component (e.g., 350) coupled therewith. In embodiments of the present invention, identification of geo-referenced object 210 may further comprise additional input from a user of handheld electronic device 100, or device 400, based upon the results returned In step 550 of FIG. 5, a description of the geo-referenced object which is stored in a database is accessed. As described above with reference to FIG. 3, database 320 is accessed and a description (e.g., 325) of geo-referenced object 210 is accessed based upon the identification of the object performed in step 540.

Embodiments of the present invention, a geo-referenced object identification method, system, and apparatus, are thus described. While the present invention has been described in particular embodiments, it should be appreciated that the present invention should not be construed as limited by such embodiments, but rather construed according to the following claims.

What is claimed is:

1. A hand held electronic device comprising:
   a position determining component coupled with a bus, wherein said bus is disposed within said handheld electronic device, said position determining component configured to determine a geographic position of said handheld electronic device;

an azimuth determination component coupled with said bus, said azimuth determination component configured to determine an azimuth from said handheld electronic device to an object;

an incline measurement device coupled with said bus, said incline measurement device configured to measure a vertical angle between said handheld electronic device and said object;

a processor coupled with said bus, wherein said processor is disposed within said handheld electronic device, said processor configured to access said geographic position, said azimuth, and said vertical angle, and configured to access a description of said object stored in a database separate from said handheld electronic device; and an object identification component coupled with said bus, said object identification component configured to identify said object based upon said geographic position, said azimuth, and said vertical angle.

2. The handheld electronic device of claim 1 further comprising:
a wireless communication component coupled with said bus for communicatively coupling said processor with said database.

3. The handheld electronic device of claim 2 wherein said wireless communication component is compliant with a specification selected from the group consisting essentially of the Global System for Mobile Communications (GSM) specification and the Global Packet Radio Service (GPRS) specification.

4. The handheld electronic device of claim 1 further comprising:
an image capture device coupled with said bus for capturing an image of said object; and
a display device coupled with said bus for displaying said image.

5. The handheld electronic device of claim 4 wherein said position determining component, said azimuth determination component, and said incline measurement device are removeably coupled with said bus via an interface.

6. The handheld electronic device of claim 1 wherein said accessing of said database is based upon a distance between said handheld electronic device and said object.

7. The handheld electronic device of claim 6 wherein said processor is further for determining said distance between said handheld electronic device and said object.

8. The handheld electronic device of claim 6 further comprising:
a range determining component coupled with said bus for determining said distance between said handheld electronic device to said object.

9. The handheld electronic device of claim 1 further comprising:
a data input device coupled with said bus and wherein said processor is further for updating said description in said database.

10. The handheld electronic device of claim 1 wherein said position determining component comprises a Global Navigation Satellite System/Global Positioning System (GNSS/GPS) device.

11. A method for identifying a geo-referenced object, said method comprising:
determining a geographic position of a handheld electronic device using a position determining component coupled with said handheld electronic device;

determining an azimuth from said handheld electronic device to said geo-referenced object using an azimuth determination component coupled with said hand held electronic device;

measuring a vertical angle between said handheld electronic device and said geo-referenced object using an incline measurement device coupled with said handheld electronic device;

identifying said geo-referenced object based upon said geographic position, said azimuth, and said vertical angle, wherein said identification of said geo-referenced object is accomplished by said handheld electronic device; and accessing a description of said geo-referenced object which is stored in a database separate from said handheld electronic device.

12. The method as recited in claim 11 further comprising:
communicatively coupling said handheld electronic device with said database using a wireless communication component.

13. The method as recited in claim 12 wherein said communicatively coupling said handheld electronic device comprises:
utilizing a wireless communication component which is compliant with a specification selected from the group consisting essentially of the Global System for Mobile Communications (GSM) specification and the Global Packet Radio Service (GPRS) specification.

14. The method as recited in 11 further comprising:
capturing an image of said object using an image capture device disposed within said hand held electronic device; and
displaying said image using a display device disposed within said handheld electronic device.

15. The method as recited in claim 14 further comprising:
removeably coupling said position determining component, said azimuth determination component, and said incline measurement device with said handheld electronic device via an interface.

16. The method as recited in claim 11 further comprising:
determining a distance between said handheld electronic device and said object; and
initiating said accessing of said description based upon said distance.

17. The method as recited in claim 16 further comprising:
utilizing said processor to determine said distance between said handheld electronic device and said object.

18. The method as recited in claim 16 further comprising:
utilizing a range determining component coupled with said handheld electronic device to determine said distance between said handheld electronic device to said object.

19. The method as recited in claim 11 further comprising:
updating said description in said database using a data input device disposed within said hand held electronic device.

20. The method as recited in claim 11 wherein said determining said geographic position further comprises:
utilizing a Global Navigation Satellite System/Global Positioning System (GNSS/GPS) device to determine said geographic position.

21. An electronic device for identifying a geo-referenced object, said electronic device comprising:
a position determining component configured to determine a geographic position of said electronic device;
an azimuth determination component configured to determine an azimuth from said electronic device to said geo-referenced object;

an angle measurement component configured to measure a reference angle between said electronic device and a reference direction;

an object identification component configured to identify said geo-referenced object based upon said geographic position, said azimuth, and said vertical angle; and a processor disposed within said electronic device, said processor configured to access a description of said geo-referenced object in a externally database separate from said electronic device, and configured to access said description based upon said geographic position, said azimuth, and said reference angle.

22. The electronic device of claim 21 further comprising:
a wireless communication component for communicatively coupling said electronic device with said database.

23. The electronic device of claim 22 wherein said wireless communication component is compliant with a specification selected from the group consisting essentially of the Global System for Mobile Communications (GSM) specification and the Global Packet Radio Service (GPRS) specification.

24. The electronic device of claim 21 further comprising:
an image capture device disposed within said electronic device for capturing an image of said object; and
a display device disposed within said electronic device for displaying said image.

25. The electronic device of claim 24 wherein said position determining component, said azimuth determination component, and said incline measurement device are removeably coupleable with said electronic device via an interface.

26. The electronic device of claim 21 wherein said electronic device determines said distance between said electronic device and said object.

27. The electronic device of claim 21 further comprising:
a range determining component coupled with said electronic device for determining a distance between said handheld electronic device to said object.

28. The electronic device of claim 21 further comprising:
a data input component coupled with said electronic device for updating said description in said database.

29. The electronic device of claim 21 wherein said position determining component utilizes a Global Navigation Satellite System/Global Positioning System (GNSS/GPS) position determining component to determine said geographic position.

* * * * *

UNITED STATES PATENT AND TRADEMARK OFFICE
CERTIFICATE OF CORRECTION

PATENT NO. : 7,634,380 B2  Page 1 of 1
APPLICATION NO. : 11/452866
DATED : December 15, 2009
INVENTOR(S) : William Martin It is certified that error appears in the above-identified patent and that said Letters Patent is hereby corrected as shown below:

Col. 8, Claim 1, Line 62: delete "hand held" and insert -- handheld --

Col. 10, Claim 11, Line 3: delete "hand held" and insert -- handheld --

Col. 10, Claim 14, Line 31: delete "hand held" and insert -- handheld --

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO.      : 7,634,380 B2                                    Page 1 of 1
APPLICATION NO. : 11/452866
DATED           : December 15, 2009
INVENTOR(S)     : William Martin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 363 days.

Signed and Sealed this

Ninth Day of November, 2010

David J. Kappos
*Director of the United States Patent and Trademark Office*